(Model.)

E. C. CLARKE.
REIN HOLDER.

No. 244,550. Patented July 19, 1881.

WITNESSES:
C. Neveux
C. Sedgwick

INVENTOR:
E. C. Clarke
BY Munn & Co
ATTORNEYS.

N. PETERS, Photo-Lithographer, Washington, D. C.

UNITED STATES PATENT OFFICE.

EDWARD C. CLARKE, OF CIRCLEVILLE, OHIO.

REIN-HOLDER.

SPECIFICATION forming part of Letters Patent No. 244,550, dated July 19, 1881.

Application filed May 5, 1881. (Model.)

*To all whom it may concern:*

Be it known that I, EDWARD C. CLARKE, of Circleville, in the county of Pickaway and State of Ohio, have invented a new and useful Improvement in Rein-Holders, of which the following is a full, clear, and exact description.

The object of my invention is the production of a device to be attached to the dash-board, seat, or other part of a carriage or other conveyance for holding the reins.

Figure 1:
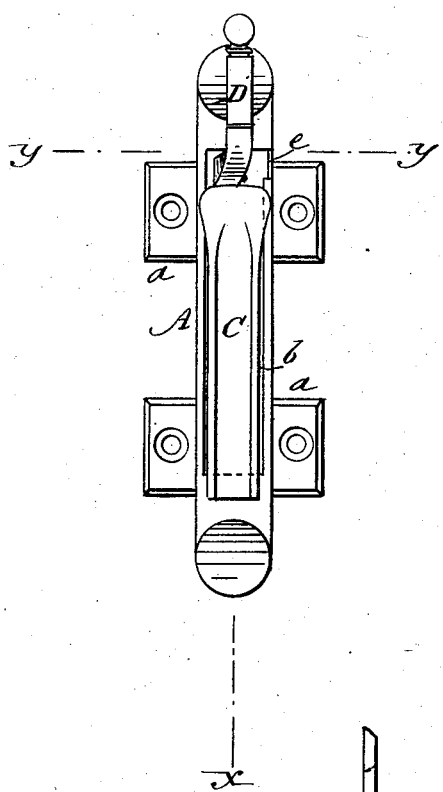
Figure 2:
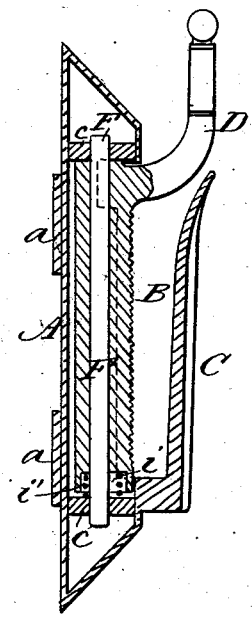

In the accompanying drawings, Figure 1 is a plan view of my improved rein-holder. Fig. 2 is a longitudinal section of the same taken on the line $x\ x$ of Fig. 1; and Fig. 3 is a cross-section taken on the line $y\ y$, Fig. 1.

Similar letters of reference indicate corresponding parts.

A represents the shell or casing, and B represents the clamp. The casing is preferably cylindrical in form and made of cast or sheet metal. To the under side of it are secured the plates $a\ a$, by means of which the device is secured, by means of screws passing through the holes therein, to the dash-board, seat, or other convenient part of the carriage or conveyance. The upper side of the casing is cut away to form the slot $b$, and to the upper side of the casing, near one end thereof, is secured the clamp-arm C, which is slightly elevated, as shown, and is above the slot and is parallel with the casing. The clamp or eccentric roller is journaled in the heads $c\ c$, which are secured in the shell or casing, as shown in Fig. 2, and the upper surface of it is serrated to form teeth, and at one end it is provided with the curved handle D, which when the device is not clasping the reins rests in the detent $e$ formed in the casing. The end of the eccentric roller opposite that at which the handle is attached is formed with the chamber $i$, in which the coiled spring $i'$, which surrounds the shaft F of the roller, is placed to keep the roller in its bearings and to prevent rattling.

Figure 3:
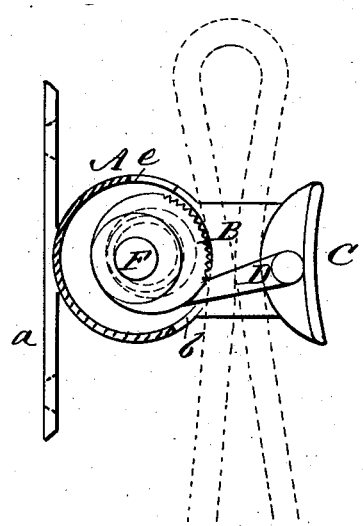

The device should be attached to the carriage in such manner that the side opposite the side having the detent for the handle will be toward the front of the carriage, or in the direction of the draw of the lines, so that when the reins are placed under the arm C and the handle of the eccentric turned to a vertical position the lines will be clasped between the eccentric roller and the arm, as shown in Fig. 3, and firmly held.

Having thus fully described my invention, what I claim as new, and desire to secure by Letters Patent, is—

A rein-holder consisting of a shell carrying the detent $e$, plates $a\ a$, and slot $b$, the eccentric clamp B, having the chamber $i$ and journaled in heads $c$, the clamp-arm C, the curved handle D, fast to clamp B, and the shaft F, carrying the spring $i'$, as shown and described.

EDWARD CHAS. CLARKE.

Witnesses:
J. F. SCHLEYER, Jr.,
G. F. DENMAN.